Sept. 4, 1928.
H. M. KNISLEY ET AL
1,683,556
HEADLIGHT SHIFTING MECHANISM
Filed Aug. 31, 1927   3 Sheets-Sheet 1
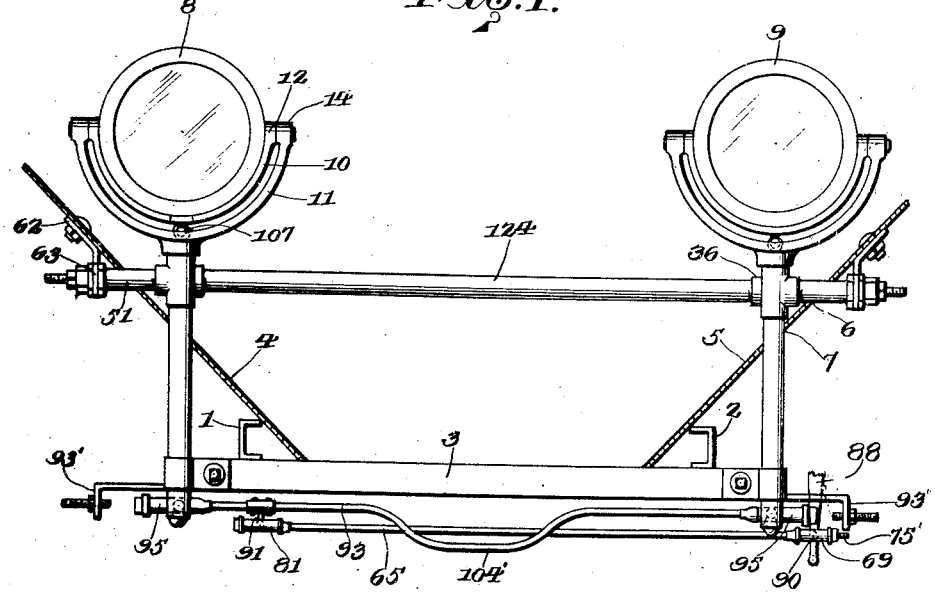
INVENTORS.
Harry M. Knisley
BY Clifford A. Creswell
AND Harry F. Messer,
Geo. P. Kimmel
ATTORNEY.

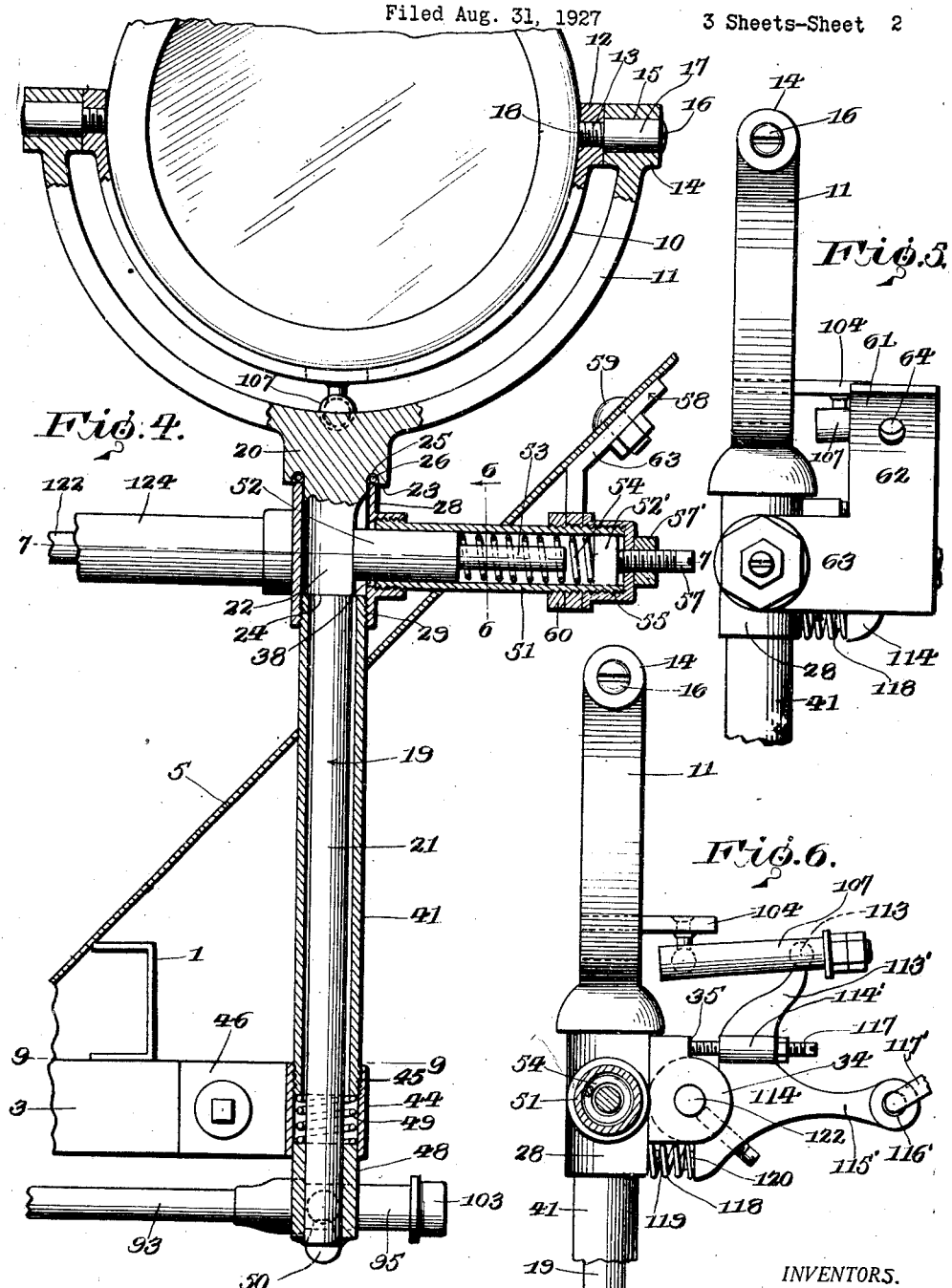

Sept. 4, 1928. 1,683,556
H. M. KNISLEY ET AL
HEADLIGHT SHIFTING MECHANISM
Filed Aug. 31, 1927  3 Sheets-Sheet 3
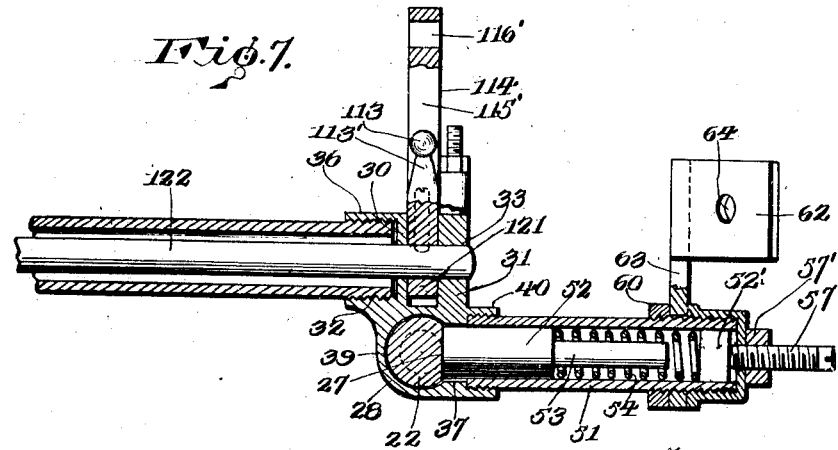
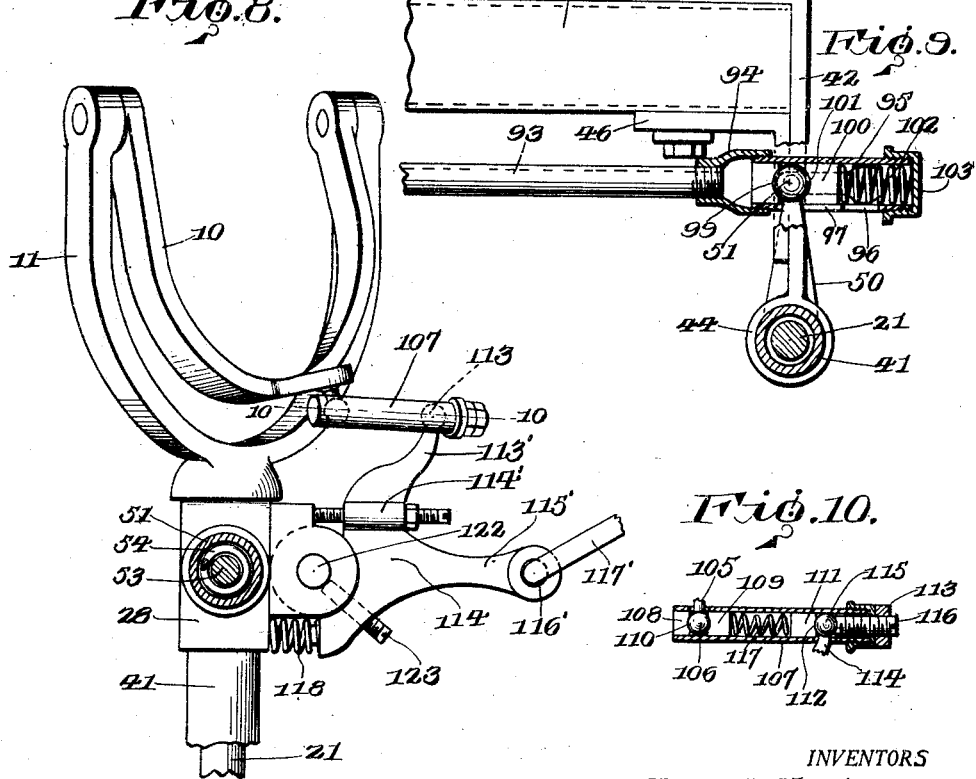
INVENTORS
Harry M. Knisley
Clifford A. Creswell
Harry F. Messer,
BY AND
Geo. P. Kimmel
ATTORNEY.

Patented Sept. 4, 1928.

1,683,556

UNITED STATES PATENT OFFICE.

HARRY M. KNISLEY, CLIFFORD A. CRESWELL, AND HARRY F. MESSER, OF LANCASTER, PENNSYLVANIA.

HEADLIGHT-SHIFTING MECHANISM.

Application filed August 31, 1927. Serial No. 216,706.

This invention relates to a headlight shifting mechanism for use in connection with dirigible headlights of motor vehicles, but it is to be understood that a shifting mechanism, in accordance with this invention, may be employed for any purposes for which it is found applicable, and the invention has for its object to provide, in a manner as hereinafter set forth, a mechanism of such class including novel and improved means whereby a headlight is caused to turn in unison with the steering wheels of the vehicle and in the same general direction so that the roadway in advance of the vehicle will be illuminated during the turning of the latter.

A further object of the invention is to provide, in a manner as hereinafter set forth, a headlight shifting mechanism for use in connection with dirigible headlights and providing means for angularly adjusting and tilting headlights in unison with the steering wheels of the vehicle and in the same general direction so that the roadway in advance of the vehicle may be illuminated and further whereby the shifting mechanism is connected with and simultaneously actuated with the steering mechanism of the vehicle upon which the headlight shifting mechanism is installed.

A further object of the invention is to provide, in a manner as hereinafter set forth, a shifting mechanism for dirigible headlights including means to prevent the rattling of a headlight post when the vehicle is travelling.

A further object of the invention is to provide, in a manner as hereinafter set forth, a shifting mechanism for dirigible headlights including means operated by the steering mechanism of the vehicle, with which the mechanism is installed, to angularly adjust a pair of headlights simultaneously and for automatically tilting said pair of headlights during the angular adjustment thereof and further for maintaining said lights in tilted position during the period in which said headlights are angularly adjusted.

A further object of the invention is to provide, in a manner as hereinafter set forth, a shifting mechanism for dirigible headlights including means for angularly adjusting the headlights and simultaneously with the angular adjustment thereof tilting the headlights in a manner whereby the light rays will be directed downwardly.

Further objects of the invention are to provide, in a manner as hereinafter set forth, a shifting mechanism for dirigible headlights which is simple in its construction and arrangement, strong, durable, compact, thoroughly efficient in its use, automatic in its action, readily installed with respect to a motor vehicle, and comparatively inexpensive to set up.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a front elevation of a shifting mechanism, in accordance with this invention, showing the adaptation thereof with respect to a pair of dirigible headlights of a motor driven vehicle.

Figure 2 is a top plan view of the mechanism, with the headlights removed, and illustrating the adaptation of the mechanism with respect to the front of a motor driven vehicle.

Figure 3 is a longitudinal sectional view, broken away, of the actuating element of the mechanism.

Figure 4 is a fragmentary view, upon an enlarged scale and in vertical section of the adaptation of the mechanism with respect to a dirigible headlight.

Figure 5 is a fragmentary view in side elevation of the mechanism.

Figure 6 is a section on line 6—6 Figure 4.

Figure 7 is a section on line 7—7 Figure 4.

Figure 8 is a fragmentary view in perspective illustrating the mechanism shifted to position a headlight in an angular direction and tilted.

Figure 9 is a section on line 9—9 Figure 4.

Figure 10 is a section on line 10—10 Figure 8.

The adaptation of the shifting mechanism is shown in connection with a pair of dirigible headlights and which are simultaneously adjusted in an angular position and further simultaneously tilted during the angular adjustment thereof. The shifting mechanism, in accordance with this invention, is operated from the steering mechanism of a motor driven vehicle with which the shifting mechanism is installed. The side bars of the chassis of the vehicle are indicated at 1, 2, the front bar of the chassis at 3 and the front fenders at 4, 5. As illustrated the fenders 4, 5 are provided with openings 6, 7 for the passage of certain elements of the shifting mechanism.

The headlights are indicated at 8, 9 and each of which is pivotally supported on its vertical axis and tiltably supported on its horizontal axis. Associated with each headlight is an inner and an outer semi-circular carrier 10, 11, one arranged within and spaced from the other. Each end of the carrier 10 is enlarged as at 12 and formed with an opening having a threaded wall. The enlargement 12 projects outwardly with respect to that end of the carrier where it is arranged. Each end of the carrier 11 is formed with a circular enlargement 14, provided with an opening 15, and said enlargement 14 projects inwardly and outwardly with respect to that end of the carrier 11 with which it is formed. The inner ends of the enlargements 14 abut against the enlargements 12 and the inner portions of the enlargements 14 in connection with the enlargements 12 maintain the inner carrier 10 in spaced relation with respect to the outer carrier 11. Secured to the headlights at diametrically opposed points is a trunnion 16 formed of two parts of different diameters and the largest part is indicated at 17 and the smallest part at 18. The parts 17 of the trunnions 16 are journalled in the openings 15 of the enlargements 14 and the parts 18 of the trunnions 16 are peripherally threaded and engage with the threaded walls of the openings 13 and also secured to the headlights. By this arrangement the carrier 10 can tilt the headlight independently of the carrier 11 and the means for tilting the headlights or rather shifting the carrier 10 to tilt the headlights will be presently referred to.

The carrier 11, centrally of its bottom is formed integral with the upper end of a pivotally mounted headlight post referred to generally by the reference character 19 and which provides means for the pivoting of the headlight on its vertical axis. The post 19 is formed of three parts of different diameters, the largest of which is indicated at 20 and the smallest of which is indicated at 21. The part of the post 19 which is of less diameter than the part 20 and of greater diameter than the part 21 is indicated at 22. The part 22 is interposed between the parts 20 and 21. The part 20 is of less height than the height of the part 22 and the part 22 is of materially less height than the height of the part 21. The providing of the post 19 of three parts of different diameters relatively to each other forms the post 19 with shoulders 23, 24. The shoulder 23 is formed at the lower end of the part 20 and is grooved as at 25 for the reception of bearing balls 26. The shoulder 24 is formed at the lower end of the part 22 and said part 22 is cut away to provide a flat face extending lengthwise thereof and indicated at 27 see Figures 4 and 7. The parts 20 and 21 of the post 19 are of circular cross section and the part 22 is circular other than the flattened portion 27 thereof.

Surrounding the part 22 of the post 19, is a combined coupling and supporting element consisting of a tubular body portion 28 of substantial length and of a length greater than the length of the part 22 of the post 19. The body portion 28 is formed at its lower end with interior threads 29 and has projecting rearwardly therefrom, a vertically disposed, spaced pair of arms 30, 31 and with the former of less thickness than the latter. The arm 30 is formed with an opening 32, which opposes an opening 33 formed in the arm 31 and the latter is provided with a rearwardly extending semi-circular projection 34 which is flush with the lower end of the arm 31 but has its upper end spaced a substantial distance below the top of the arm 31 to provide a shoulder 35. Formed integral with the arms 30, projecting outwardly therefrom and at right angles thereto is an interiorly threaded collar 36. The body portion 28 is extended laterally on its outer side as at 37 and formed with an opening 38 which communicates with the chamber 39 provided by the body portion 28 for the part 22 of the post 19.

The body portion 28 has formed integral with the extension 38 thereof an interiorly threaded collar 40 which communicates with the opening 38. The collar 40 is disposed at right angles with respect to the body portion 28. Secured to the interior threads 29 of the body portion 28 and depending therefrom is a sleeve 41 having peripheral threads at its lower and upper ends. The bearing balls 26 are mounted on the top edge of the body portion 28 and the latter supports the post from the part 20 thereof. The part 22 of the post 19 is arranged within the body portion 28 and extends above the lower end of such body portion 28. The shoulder 24 is seated on the top edge of the sleeve 41. The diameter of the part 22 is slightly less than the diameter of the body portion 28 of the combined coupling and supporting element and the diameter of the part 21 of the post 19 is less than the diameter of the sleeve 41. The part 21 projects a substantial distance below the lower end of the sleeve 41, see Figure 4.

Abutting against an end of the front bar 3 of the chassis, is a bracket member formed of a longitudinal arm 42, and a horizontal arm 43 which projects inwardly at right angles with respect to the inner end of the arm 42 and the latter has its outer end formed with a vertically disposed sleeve 44 having the upper portion of the inner face thereof provided with threads 45. The horizontal arm 43 of the bracket abuts against the rear face of the front bar 3 of the chassis. Secured against the forward face of the front bar 3 and abutting against the longitudinal arm 42 of the bracket is an angle shaped brace member 46. The bracket and brace member are fixedly secured to the front bar 3 of the chassis by a common holdfast means 47. The arm 42, with its sleeve 44, extends to the sleeve 41 and the latter has threaded engagement with the upper end of the sleeve 44 whereby the latter supports said sleeve 41. The part 21 of the post 19 extends down through the sleeve 44 a substantial distance therebelow and has fixedly secured therewith a tubular member 48 which extends into the sleeve 44, and surrounding the part 21 of the post 19 and interposed between the lower end of the sleeve 41 and upper end of the tubular member 48 is an anti-rattling spring 49 and which furthermore acts to maintain the tubular member 48 extended with respect to the sleeve 44. The member 48 is fixedly secured to the part 21 of the post 19 and formed integral with the member 48 and projecting rearwardly therefrom is an arm 50 having a globular shaped end 51.

Secured to the collar 40 and extending therefrom, at right angles with respect to the post 19, is a tubular support 51 for a spring controlled anti-rattling device which associates with the post 19 and consists of a plunger head 52, having an outwardly extending stem 53 of reduced diameter and surrounding the end 53 and abutting against the outer end of the plunger head 52 and a shiftable block 52' is a coiled controlling spring 54. The support 51 is formed with peripheral threads at its inner end for engagement with the threads of the collar 40 and has its outer end provided with peripheral threads 55 which are engaged by an interiorly threaded flanged closure cap 56 for the outer end of the support 51 and the outer end of the controlling spring 54 abuts against the cap. An adjustable stop 57, for the block 52', is carried by the cap 56. The tension of the spring 54 can be adjusted by the stop 57, and the latter has threaded engagement with the cap 56 and carries a binding nut 57'. The tubular support 51 extends through the opening 6 and also through a hanger bracket 58 which is secured to a front fender, as at 59 and depends therefrom. The cap 56 abuts against the hanger bracket 58 and a clamping nut 60 is carried by the support 51 and also abuts against the bracket 58 and the latter is of angle shaped contour. The sleeve 41 extends down through the opening 7 formed in the front fender. With reference to Figure 5 the bracket 58 includes an inclined arm 61, a vertical arm 62 and a horizontally disposed arm 63. The support 51 extends through the arm 63, and the latter is provided with an opening therefor. An opening 64 is provided in the arm 61 for the passage of the holdfast means 59.

The mechanism includes an actuating element, best shown in Figure 3, and which consists of a tubular intermediate portion 65 having threadedly engaging with each end thereof a coupling member 66, formed with a socket 68, having a threaded wall. Extending into a socket 68, as well as projecting a substantial distance therefrom, is a tubular member 69, provided with an opening 70, and an elongated slot 71 which terminates in the opening 70. The member 69 is closed at its outer end by an interiorly threaded cap piece 72, which has threaded engagement with the member 69 and said cap piece is formed with an opening 73. Extending through the cap piece 72 is an adjusting member 75' which provides a stop. Arranged within the member 69 is a pair of oppositely disposed blocks 74, 75 provided on their opposed faces with concavities 76 which are oppositely disposed and said blocks 74, 75 are formed with stems 77, 78, respectively. Surrounding the stem 77 and interposed between the block 74 and a coupling member is a coiled controlling spring 79 for said block and surrounding the stem 78 and interposed between the block 75 and the cap piece 72 is a coiled controlling spring 80 for the block 75. The tubular member 77 which projects from a coupling member 66 is of less length than the tubular member which projects from the other coupling member 66 and such tubular member is indicated at 81 and has arranged therein a pair of spring controlled shiftable blocks 82, 83 arranged in spaced relation. The tubular member 81 is formed with an opening 84 and a longitudinally extending slot 85 which opens into said opening. The outer end of the member 81 is closed by a cap piece 86 which has threaded engagement therewith. The sides of the blocks 82, 83 have their faces provided with oppositely disposed concavities 87. The actuating element is operated from the steering arm 88 of the steering mechanism of the vehicle and connected to the arm 88 is a lever arm 89 provided at its free end with a globular head 90 which is positioned between the blocks 74, 75 and said globular head 90, in connection with the blocks 74, 75, that is to say the concavities of said blocks, provide a universal joint connection between the steering arm 88 and the actuating element.

Operated from the actuating element is a shifting element for the post 19 and said shifting element is operatively connected with the actuating element by a lever arm 91, fixed at one end to the shifting element and having its other end formed with a globular head 92 which is seated in the concavities 87 of the blocks 82, 83 and said head 92, in connection with the concavities 82, 83 provides a universal joint connection between the actuating and shifting elements. The shifting element includes not only the lever arm 91 referred to, but also a tubular bar 93 of appropriate length having connected to each end thereof, as well as projecting therefrom, an offset collar 94 with which is secured a tubular member 95 formed with an opening 96 and a slot 97 which terminates at one end in the opening 96. Fixed within the collar 94 is an abutment 98 formed with a concavity 99 and opposing the abutment 98 is a spring controlled block 100 provided with a concavity 101. The globular head or end 51 of the arm 50 is interposed between the abutment 98 and block 100 and seats in the concavities 99 and 101. The controlling spring for the block 100 is indicated at 102. The tubular member 95 is closed by a cap piece 103 at its outer end. The bar 93, centrally thereof, is formed with a forwardly directed portion 104′ but this portion can be dispensed with if desired. Adjustable, oppositely disposed stops 93′ are provided for limiting the movement of the shifting element. The stops 93′ are secured to the arms 42 and project outwardly therefrom.

By the arrangement set up when the actuating element is shifted from the steering arm 88, the shifting element is carried in the same direction, and the post 19 will be rotated whereby the carriers 10 and 11 will be bodily shifted therewith. The openings 70, 84, and 96 provide means for the entrance of the heads 90, 92, and 51 and the slots 71, 85, and 97 permit of the shifting of the arms 89, 91 and 50 respectively. The slots are much narrower than the openings referred to.

For the purpose of automatically tilting the headlights, simultaneously with the shifting of the carrier 11 by the post 19, the carrier 10 at its bottom is formed with a rearwardly extending arm 104, provided with a depending extension 105 formed with a globular lower end 106, and the latter is arranged within a tubular support 107, between a fixed block 108 and a spring controlled slidable block 109. The blocks 108 and 109 have concavities 110 for the reception of the globular end 106. Arranged within the tubular support or member 107 is a spring controlled slidable block 111, having a concavity 112, in which seats the globular head or end 113 of an upstanding arm 113′ of a lever member 114. The tubular member 107 is closed by a cap piece 115, in which is mounted an adjustable stop member 116 for the head or end 113. The controlling spring for the slidable blocks 109 and 111 is indicated at 117 and which is common to said blocks and interposed between the same, see Figure 10. The lever member 114, is formed at one side with an offset portion 114′ formed with an opening having a threaded wall, and engaging with said wall is an adjustable stop member 117 which associates with the shoulder 35, as indicated in Figure 6. The lever member 114 is further formed with a rearwardly extending arm 115′ provided with an eye 116′. The lever member 114 is spring controlled and the controlling spring therefor is indicated at 118 and is interposed between the body portion 28 and said lever member, see Figure 6. The body portion 28 and lever member 114 are formed with opposed studs 119, 120 and upon which the spring 118 is mounted and the latter acts as a means for normally maintaining the adjustable stop 117 in engagement with the abutment or shoulder 35. The lever member 114 is provided with a hub 121 which is mounted on a shaft 122 journaled in the arms 30, 31, see Figure 7. A set screw 123 is carried by the lever member 114 and binds against the shaft 122.

The lever member 114 at the right, as well as the one to the left, may be set up with the arm 115′, but preferably the lever member 114 at the right is not provided with an arm 115′.

The eye 116′, of the arm 115′ which is formed on the lever member 114 at the left, is provided for connection with the lever member 114 a shifting means therefor. The shifting means is indicated at 117′ and is of the foot operative type and is employed for shifting that lever member to which it is connected in a direction to tilt the lights downward a little on a straight road when driving in the city or lighted districts. Any suitable means can be employed to cause the shift of the lever member 114, at the left, to tilt the lights and hold them releasably in tilted position.

The plunger 52, Figure 4, with the spring 54 operating plunger 52 holds the light post 19 in a fixed central position, the spring being heavy enough to hold lights against the springs 79—80, Figure 3, thus avoiding shimming headlights. The amount of motion of the wheels which is about ⅜″ before operating the lights being adjusted by the adjusting members 75′, Figure 3. The steering pitman arm for operating the headlights is the same length as the one for steering the front wheels and the arms 50—51, Figure 9, are about half the length of the arms on the front wheel knuckles, by this arrangement the lights are turned faster than the wheels, thus making up for the amount allowed in the member 69, Figure 3, for slight turning of the wheels on the straight road, and also, when the wheels are at about 30 degrees angle the lights are at their limit, which is against the adjustable stops 93′ Figure 1, and are at about the same angle as the front wheels. The front wheels can still be turned at a greater angle than 30 degrees, but the lights remain against the stops 93' Figure 1 and then the springs in the tube 81, Figure 3, are brought into operation, leaving the member 65, Figure 3 move with the wheels and ball 92 on number 91 Figure 3, which is on the tie rod of the lights remains still.

The springs 54, Figure 4, are to be heavy enough to hold the lights central against the springs 70—80, Figure 3, until the ends 77—78 of blocks 74—75 come against the end of the tube and the adjusting screw 75' Figure 3. The springs 84—85 Figure 3 are to be heavy enough to hold the ball 93 of part 91 in a central position in its tube until the parts 95, Figure 1, come against the adjustable stops 93', Figure 1.

The combined coupling and supporting element which is associated with one headlight is connected to the other combined coupling and supporting element for the other headlight by a tube 124 which has threaded engagement with the collars 36 of the arms 30, extending through said tube 124 is the shaft 122.

When a carrier 11 is moved on its vertical pivot the carrier 10 moves therewith but the movement of the carrier 10 is had against the action of the stop 117 and blocks 109 and 111, and as the carrier 11 moves around on its vertical pivot the carrier 10 will be caused to tilt to the position shown in Figure 8 whereby the headlight is tilted and the light rays therefrom are directed downwardly. As the carrier 11 moves around, the support or tubular member 107 holds the carrier 11 to cause it to assume the position shown in Figure 10, as the support 107 will swing on the joint connection between the head 115 and the blocks 111, and the joint connection between the globular end 106 and the blocks 108 and 109 although allowing the carrier 10 to swing around, the carrier 10 will be caused to move to the position shown in Figure 8 and tilt the headlight downwardly. When the carrier 11 swings to normal position the carrier 10 will assume normal position, as the member 107 will be caused to assume normal position by the controlling springs for the slidable blocks. The inner end of the stop member 116 is concaved and opposes the concavity 112 on the block 111.

A headlight shifting mechanism in accordance with this invention, provides a self tilting headlight in turning corners, an anti-shimming headlight, further providing for the turning of the headlights no further than is required for ordinary driving and does not interfere with the steering gear in making a short turn, further a mechanism which is very rigid, simple and anti-rattling, providing for the slightly tilting of the head lights when driving in lighted districts where light far ahead is not required as on an open unlighted highway and with such slight tilting not interfering in any way with the self tilting means, and further a head light mechanism that can be used on all kinds of motor vehicles by a slight change in connection with the coupling means that retains the mechanism in position, and with slight change in the shape of the means that shifts the light.

The construction and arrangement of the headlight shifting mechanism as hereinbefore set forth, provides for the angularly adjusting of the headlights simultaneously, and with such adjustment had during the steering of the vehicle whereby the headlights will be shifted to project the light rays in the direction of turn, and further simultaneously with this arrangement the headlights will be tilted so that the light rays will be directed downwardly upon the roadway, and therefore it is thought the many advantages of a headlight shifting mechanism, in accordance with this invention, can be readily understood, and although the preferred embodiment of the invention is as illustrated and described, yet it is to be understood that changes in the details of construction can be had which will fall within the scope of the invention as claimed.

What we claim is:

1. In a shifting mechanism for the headlights of a motor vehicle, a pair of fixed vertical supports having rotatable shafts carried thereby, means for mounting headlights on the shafts to turn therewith and to simultaneously swing on horizontal axes, means connecting the shafts with a steering mechanism for rotating the shafts, said shafts being formed with flat longitudinal face portions, and spring actuated plungers extending through the supports and having flat inner ends for engagement with the flat face portions of the shafts.

2. In a shifting mechanism for the headlights of a motor vehicle, a pair of fixed vertical supports having rotatable shafts carried thereby, means operatively connecting the shafts with a steering mechanism, means for mounting headlights on the shafts to turn therewith and to permit shifting of the headlights on horizontal axes, levers mounted on the fixed supports to swing on horizontal axes, adjustable means for limiting the movement of the levers in one direction, yielding means for normally holding the levers against movement in the other direction, means providing universal joint connections between the levers and headlights, and means connected with the levers for shifting them on their pivots.

3. In a shifting mechanism for the headlights of a motor vehicle, a pair of vertical rotatable shafts, a collar fixed to the lower end of each of said shafts and formed with an arm, a tie rod having universal joint connections with said arms, a connecting rod having a universal joint connection with the tie rod and formed with means to provide a universal joint connection with a steering mechanism, means to normally hold the shafts against rotation, means for mounting headlights on said shafts to rotate therewith and to permit tilting of the headlights about horizontal axes, means whereby the rotation of said shafts actuate the headlights to tilt the same, and means whereby said headlights may be tilted independently of the rotation of the shafts.

4. In a shifting mechanism for the headlights of a motor vehicle, a pair of vertical rotatable shafts, a collar fixed to the lower end of each of said shafts and formed with an arm, a tie rod having universal joint connections with said arms, a connecting rod having a universal joint connection with the tie rod and formed with means to provide a universal joint connection with a steering mechanism, means to normally hold the shafts against rotation, a fixed yoke formed on the upper end of each shaft, a movable yoke pivotally connected with the fixed yoke and adapted for immovable connection with a headlight, a lever carried by each of said supports, and a link having universal joint connections with the lever and movable yoke, said levers being pivoted on horizontal axes and having means for normally preventing pivotal movement.

In testimony whereof, we affix our signatures hereto.

HARRY M. KNISLEY.
CLIFFORD A. CRESWELL.
HARRY F. MESSER.